United States Patent Office 3,254,323
Patented May 31, 1966

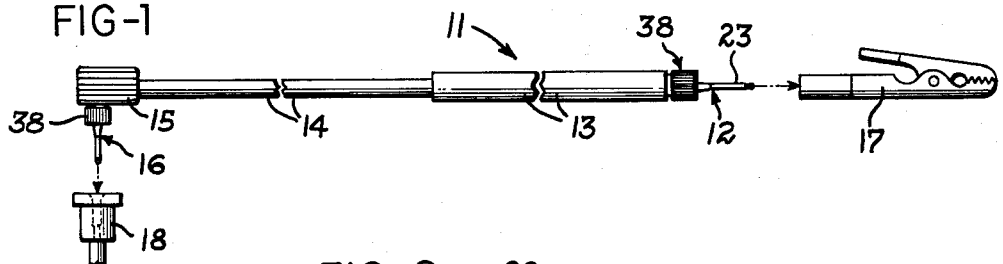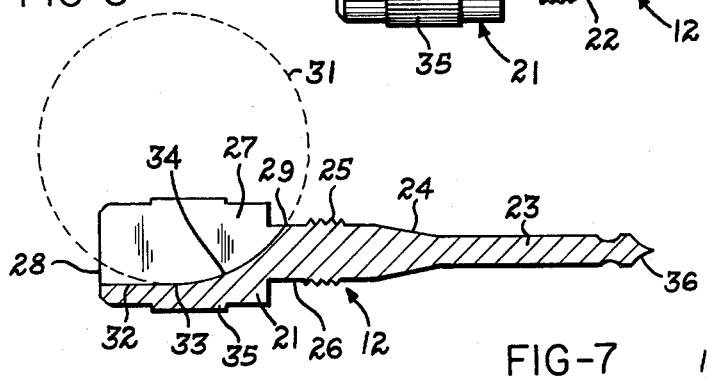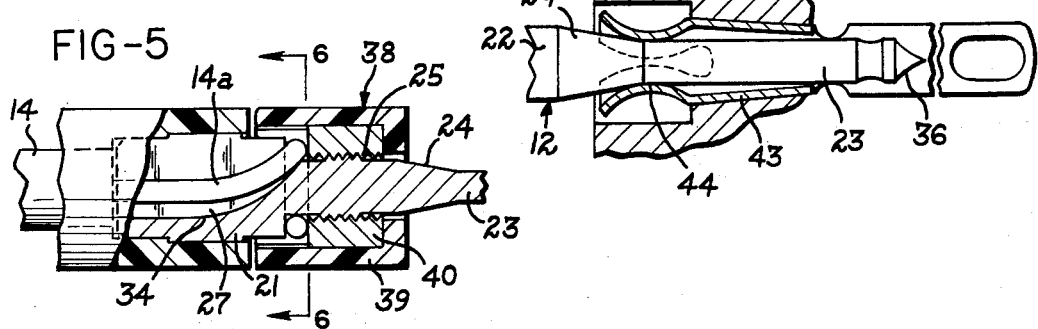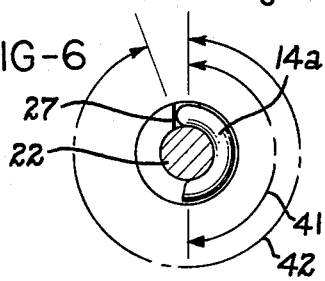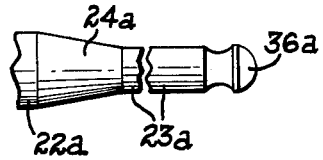

3,254,323
ELECTRICAL CONNECTIONS
David S. Wyse, Dayton, Ohio, assignor to Projects Unlimited, Inc., Dayton, Ohio, a corporation of Ohio
Filed May 7, 1963, Ser. No. 278,571
1 Claim. (Cl. 339—105)

The inventions disclosed in this application relate to electrical test probe tips for the making of electrical connections.

Heretofore electrical test probe tips have been manufactured in which there is provided a relatively large body portion, an intermediate portion having an intermediate diameter and a tip portion having a relatively small diameter, there being abrupt shoulders between the body portion and the intermediate portion and between the intermediate portion and the tip portion. In such previously manufactured tips, the body portion has at times been formed with one or more bores into which wires extend, intended to be secured by soldering or by other similar type fastening within the bore in the body.

An object of this invention is the provision of a new and improved form of test prod tip.

A further object of the invention is the provision of a new and improved test prod tip in which the tip is more easily and correctly located, and is held more readily and rigidly within the female contact and in which there is compensation for wear and more consistent maintenance of the proper contact.

Further objects, features, and advantages will be apparent from the following specifications, claims and from the accompanying drawings.

In the drawing:—

FIG. 1 is a view in side elevation of a complete test lead assembly having a straight contact at one end and a right angle contact at the other, the contacts being embodiments of the invention herein disclosed;

FIG. 2 is a view in elevation on an enlarged scale of the straight contact end test prod tip shown in FIG. 1 having the clamping nut removed for clarity;

FIG. 3 is a view in vertical section of the tip of FIG. 2;

FIG. 4 is a view in end elevation of the tip shown in FIGS. 2 and 3;

FIG. 5 is a view partially in vertical section and partially in side elevation and on an enlarged scale of a fragmentary portion of the assembly shown in FIG. 1;

FIG. 6 is a view in vertical section taken substantially as if on the line 6—6 of FIG. 5 but having the clamping nut removed for clarity;

FIG. 7 is a view partially in elevation and partially in section illustrating the cooperation of the test prod tip of FIG. 2 with a female contact element; and FIG. 8 is a fragmentary view on an enlarged scale to illustrate a modified embodiment of the tip of FIG. 2.

Referring to the above drawing which discloses a preferred embodiment illustrating the invention, there is shown in FIG. 1 a test lead assembly 11 having a straight contact at one end consisting of the test prod tip 12 and the straight plastic plug 13 within which most of the body portion 21 (see FIG. 2) of the tip 12 is enclosed. Extending through the hollow plastic plug 13 is an insulation covered wire 14 which is connected electrically (as will be later more fully described) to the test prod tip 12. The other end of the wire 14 extends into the right angle plastic plug 15 and thence into the test prod tip 16. The plug 15 and the test prod tip 16 form a right angle contact at the end of the test lead assembly 11 opposite to the straight contact consisting of the test prod tip 12 and the plastic plug 13. The tip 12 is adapted to be inserted in any appropriate female contact element such as for example the alligator clip 17. Similarly the tip 16 is adapted to be inserted into any appropriate female contact element as for example the element 18.

The tip 12 consists of a body portion 21, an intermediate portion 22 and a small diameter portion 23. Between the intermediate portion 22 and the small diameter portion 23, there is provided a tapered section 24 having a surface which is at an angle to the longitudinal center line of the tip. It is preferred that the taper be at a substantial angle as for example at an angle of approximately 10°, as shown, or greater. The body portion 21 has a relatively large diameter. The tip portion 23 has a relatively small diameter and the intermediate portion 22 has a diameter intermediate the diameters of the portions 21 and 23. Threads 25 are formed on a part of the intermediate portion 22, and these threads are raised above the diameter of the other parts of the portion 22. The threads 25 are separated from the body portion 21 by a space 26 which is provided for purposes which will be clear later in this description.

The body portion 21 is formed as shown best in FIGS. 3 and 4 with a lateral slot 27 extending longitudinally of the body 21 and extending partially into the intermediate portion 22 between the threads 25 and the body 27. The slot may be formed in any appropriate manner but it is preferred to form it by means of a slotting saw or a cutter such as a Woodruf cutter. The saw or cutter may have any appropriate diameter but it is preferable to start the cutting operation at the rear end 28 of the body 21 and move the saw forward relatively to the tip until its forward end exactly reaches the point 29. The position of the point 29 should be exactly controlled. The circumference of the saw is indicated by the dotted line 31. It must be noted however, that the slot has a uniform depth at the rear of the body as at 32 and extending forward therefrom to about the point 33 but that the depth is gradually decreased from 33 towards the front of the body 21 as at 34. The body 21 is formed with a knurled band 35 which aids in its retention within the plug 13. It will be noted that the depth of the slot at the rear end of the body 21 extends laterally from the top downward past the longitudinal center line of the body. It will also be noted that the slot extends longitudinally from one end of the body to the opposite end. The wire 14, as shown best in FIG. 5, extends through a central hollow in the plug 13 and through the slot 27 of the body 21 thence out of the slot just rearward of the point 29. It is there wrapped partially around the circumference of the space 26 of the intermediate portion 22 between the body 21 and the screw threads 25. The portion of the wire 14 within the slot 27 (designated 14a in FIG. 5) and the portion wrapped around the portion 22 is stripped of insulation so that it may contact the body 21 within said body and with the intermediate portion 22 at the space 26. A knurled nut 38 comprising a plastic cover 39 and a metallic sleeve 40 (the sleeve 40 being press fitted within the cover 39) is threaded onto the threads 25 and clamps the outer end of the wire 14a between the metal sleeve 40 and the metal body 21 so that a tight contact is obtained. The end of the wire 14a is wrapped around the portion 22 at 26 for at least 180°, but for less than 360°. The arrow 41 in FIG. 6 indicates the minimum wrap and the arrow 42 indicates approximately the maximum wrap. Thus a good connection may be quickly formed without the use of solder.

In FIG. 7 the tip 12 is shown inserted in the female contact element 43, the tip portion 23 being received therein and the tapered portion 24 seating against the opening thereof. It will be noted that contact is made approximately at 44 which is at the junction of the tip portion 23 and the tapered portion 24. This ensures a steady and rigid contact, ensures a proper location of the tip within the female contact element, compensates for wear, and is more consistent in maintaining a satisfactory contact between the tip and the female contact element.

In FIG. 8 a slightly modified tip is shown having an intermediate portion 22a, a tapered portion 24a and a rounded end 36a instead of the pointed end 36 shown in FIG. 2.

As explained above, the tips 12 and 16 may be inserted in any appropriate female contact element and by reason of the tapered portion 24 will make a firm and consistent contact regardless of wear and will locate the tip more easily in the female contact element and hold it more steady and more rigid therein.

While the forms of prod tips herein described constitute preferred embodiments of the invention, it is to be understood that the invention is not limited to these precise forms and changes may be made therein without departing from the scope of the invention which is defined in the appended claim.

What is claimed is:

An electrical connector of the character described comprising, a prod tip male contact element adapted to be inserted into a female contact element to make an electrical contact within the body of the female contact element, said male contact element including an integral body having a relatively large diameter portion at one end thereof, said male contact element having an intermediate diameter portion adjacent said large diameter portion and a tip portion having a relatively small diameter on the opposite end of said intermediate portion, said male contact element having a radial shoulder formed between said large and intermediate diameter portions and a tapered section between said intermediate and tip portion adapted to seat in the female contact element and having a taper which is at an angle of approximately 10° to the center line of said male contact element, said intermediate portion having a raised threaded portion between said shoulder and said tapered section, means defining a longitudinal radial slot formed in said large portion and having an arcuate end which extends partially into said intermediate portion to allow a wire to extend from said slot and around said intermediate portion, said slot having a radial depth greater than the radius of said large portion, a wire extending through said slot from said one end and wrapped partially around and in substantial contact with said intermediate portion between said large portion and the raised threaded portion, and a cover member threaded onto said threaded portion to surround and clamp the wrapped portion of the wire between the cover member and said shoulder formed between said body and intermediate portion, said tip portion being receivable within said female contact element with said tapered section seating within the opening thereof.

References Cited by the Examiner

UNITED STATES PATENTS

| | | | |
|---|---|---|---|
| 2,580,682 | 1/1952 | Kraft et al. | 339—31 |
| 2,654,075 | 9/1953 | Gaborc | 339—255 X |
| 2,706,283 | 4/1955 | Cahn | 339—26 |
| 2,755,451 | 7/1956 | Smyers | 339—268 X |
| 2,806,919 | 9/1957 | Conrad | 339—269 X |
| 2,825,882 | 4/1958 | Mitchell | 339—183 |

JOSEPH D. SEERS, *Primary Examiner.*

W. DONALD MILLER, *Examiner.*